(12) United States Patent
Fujita

(10) Patent No.: US 11,381,728 B2
(45) Date of Patent: Jul. 5, 2022

(54) IMAGE CAPTURE APPARATUS AND METHOD FOR CONTROLLING THE SAME

(71) Applicant: CANON KABUSHIKI KAISHA, Tokyo (JP)

(72) Inventor: Atsushi Fujita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/995,991

(22) Filed: Aug. 18, 2020

(65) Prior Publication Data

US 2021/0058544 A1 Feb. 25, 2021

(30) Foreign Application Priority Data

Aug. 21, 2019 (JP) .............................. JP2019-151373

(51) Int. Cl.
- *H04N 5/225* (2006.01)
- *H04N 5/232* (2006.01)
- *G06T 5/00* (2006.01)
- *G06T 7/00* (2017.01)

(52) U.S. Cl.
CPC ......... *H04N 5/23212* (2013.01); *G06T 5/006* (2013.01); *G06T 7/0012* (2013.01); *G06T 2207/30041* (2013.01)

(58) Field of Classification Search
CPC ......... H04N 5/23212; H04N 5/232123; H04N 5/23219; G06T 5/006; G06T 7/0012; G06T 2207/30041; G06T 2207/30201; G06T 7/73
USPC .................................................... 348/207.99
See application file for complete search history.

(56) References Cited

U.S. PATENT DOCUMENTS

| 2015/0181106 | A1* | 6/2015 | Komori | .............. | H04N 9/04557 |
| | | | | | 348/349 |
| 2017/0289441 | A1* | 10/2017 | Zhang | .............. | H04N 5/232123 |

FOREIGN PATENT DOCUMENTS

JP 2015-096961 A 5/2015

\* cited by examiner

*Primary Examiner* — Stephen P Coleman
(74) *Attorney, Agent, or Firm* — Cowan, Liebowitz & Latman, P.C.

(57) ABSTRACT

An image capture apparatus that detects, from an image, a subject area and a characteristic area within the subject area is disclosed. The image capture apparatus sets an AF area to the characteristic area and detects a defocus amount for the AF area and defocus amounts for peripheral areas of the AF area. The image capture apparatus corrects the defocus amount detected for the AF area based on the defocus amounts detected for the peripheral areas and adjusts focus of an imaging optical system based on the corrected defocus amount.

12 Claims, 6 Drawing Sheets

FIG. 5A
| I | B | C |
|---|---|---|
| H | A | D |
| G | F | E |
FIG. 5B
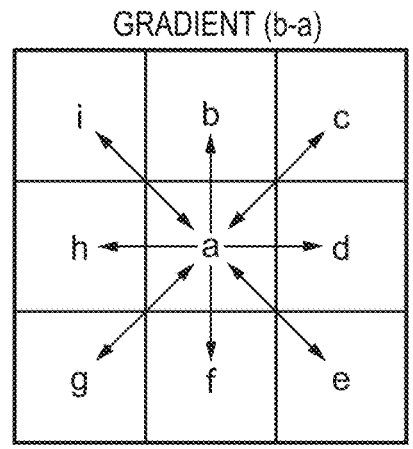
FIG. 5C
| -20 | 20 | 30 |
|---|---|---|
| -20 | 30 | 40 |
| -40 | 60 | 50 |
FIG. 5D
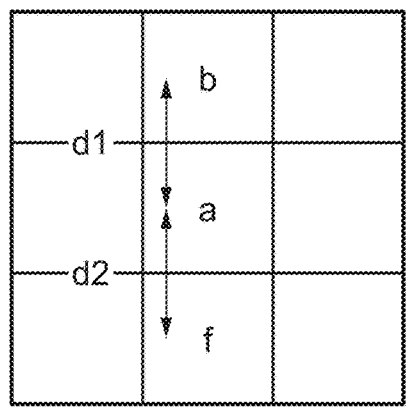

IMAGE CAPTURE APPARATUS AND METHOD FOR CONTROLLING THE SAME

BACKGROUND OF THE INVENTION

Field of the Invention

The present invention relates to an image capture apparatus and a method for controlling the same and particularly relates to a focus adjustment technique.

Description of the Related Art

An image capture apparatus is known that automatically sets a focus detection area (AF area) to a subject area detected by image processing. Also, in recent years, an image capture apparatus has been proposed (Japanese Patent Laid-Open No. 2015-096961) that automatically sets an AF area to a characteristic area within a subject area (for example, an eye area within a face area).

Setting the AF area to a characteristic area within a subject area is understood to be important for capturing images needing precise focus adjustment for the characteristic area. When subjects at different distances are included in the AF area, the accuracy of the AF area decreases. In this case, the AF area can be reduced to reduce the possibility of unintended subjects being included in the AF area. However, reducing the AF area reduces the pixel count of the AF area, and this may lead to a decrease in the accuracy and reliability of focus detection.

SUMMARY OF THE INVENTION

The present invention was made in light of the technological problem described above. The present invention provides an image capture apparatus and a method for controlling the same capable of improving the focus detection accuracy in an AF mode in which a characteristic area within a subject area is focused on.

According to an aspect of the present invention, there is provided an image capture apparatus comprising: an area detection circuit that detects, from an image, a subject area and a characteristic area within the subject area; a setting circuit that sets an AF area to the characteristic area; a defocus amount detection circuit that detects a defocus amount for the AF area and defocus amounts for peripheral areas of the AF area; a correction circuit that corrects the defocus amount detected for the AF area based on the defocus amounts detected for the peripheral areas; and a focus adjustment circuit that adjusts focus of an imaging optical system based on the defocus amount corrected by the correction circuit.

According to an aspect of the present invention, there is provided a method for controlling an image capture apparatus comprising: detecting, from an image, a subject area and a characteristic area within the subject area; setting an AF area to the characteristic area; detecting a defocus amount for the AF area and defocus amounts for peripheral areas of the AF area; correcting the defocus amount detected for the AF area based on the defocus amounts detected for the peripheral areas; and adjusting focus of an imaging optical system based on the defocus amount corrected in the correcting.

According to an aspect of the present invention, there is provided a non-transitory computer-readable medium that stores a program for causing a computer included in an image capture apparatus to functions as: an area detection unit configured to detect, from an image, a subject area and a characteristic area within the subject area; a setting unit configured to set an AF area to the characteristic area; a defocus amount detection unit configured to detect a defocus amount for the AF area and defocus amounts for peripheral areas of the AF area; a correction unit configured to correct the defocus amount detected for the AF area based on the defocus amounts detected for the peripheral areas; and a focus adjustment unit configured to adjust focus of an imaging optical system based on the defocus amount corrected by the correction unit.

Further features of the present invention will become apparent from the following description of exemplary embodiments (with reference to the attached drawings).

BRIEF DESCRIPTION OF THE DRAWINGS

FIGS. 5A through 5D are diagrams relating to defocus amount correction processing of an embodiment.

DESCRIPTION OF THE EMBODIMENTS

Figure 1:
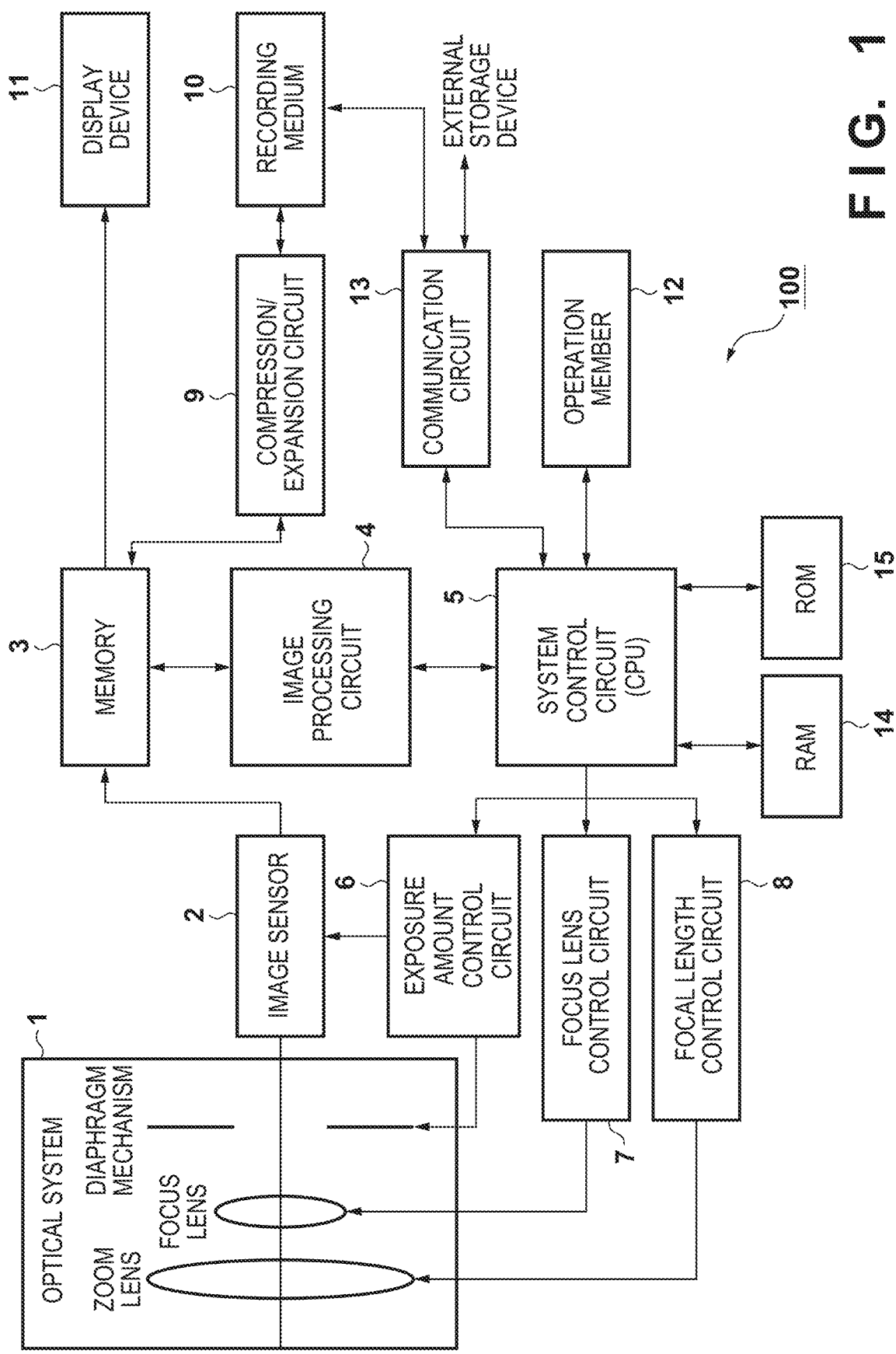
FIG. 1 is a block diagram illustrating a functional configuration example of a digital camera representing an image capture apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Note that in the embodiments described below, the present invention is embodied as a digital camera. However, the present invention can be applied to any electronic device with an image capture function. Examples of such an electronic device include video cameras, computer devices (personal computers, tablet computers, media players, PDAs, and the like), mobile phones, smartphones, game consoles, robots, drones, and drive recorders. These are examples, and the present invention can be applied to other electronic devices.

FIG. 1 is a block diagram illustrating a functional configuration example of a digital camera 100 representing an image capture apparatus according to the present invention.

An imaging optical system 1 includes a plurality of lens groups and a diaphragm mechanism and forms an optical image of the subject on an imaging surface of the image sensor 2. The plurality of lens groups are constituted by movable lens, such as focus lenses and zoom lenses. Also, the imaging optical system 1 includes drive circuits for the movable lenses and a drive circuit for the diaphragm mechanism. The drive circuits are constituted by a motor, an actuator, and the like. As illustrated in FIG. 1, the imaging optical system 1 is fixed to the digital camera 100. However, the imaging optical system 1 may be replaceable. In the case of the imaging optical system 1 being replaceable, the imaging optical system 1 is mechanically and electrically connected to the body of the digital camera via a lens mount and operates according to control from the body.

An image sensor 2 is a charge-coupled device (CCD) image sensor or a complementary metal-oxide-semiconductor (CMOS) image sensor. The image sensor 2 includes a color filter for capturing color images. In the image sensor 2, a plurality of pixels are arranged in a two-dimensional arrangement. Also, in each pixel, a single micro lens and one or more photoelectric conversion areas are provided. The image sensor 2 converts an optical image formed on the imaging surface into an electric signal at each pixel and generates an image signal corresponding to the optical image. The image sensor 2 of the present embodiment includes an A/D converter and outputs a digital image signal (image data). In a case in which a plurality of photoelectric conversion areas are provided in each pixel, the image sensor 2 is capable of outputting image data corresponding to at least one photoelectric conversion area in a pixel and outputting image data corresponding to all of the photoelectric conversion area in a pixel. In a case in which a plurality of photoelectric conversion areas are provided in each pixel, phase detection AF based on the image data output by the image sensor 2 is enabled.

A memory 3 temporarily stores image data output from the image sensor 2, image data for processing by an image processing circuit 4 and a compression/expansion circuit 9, and the like. Also, a portion of the memory 3 is used as video memory for storing image data displayed on a display device 11.

The image processing circuit 4 applies a preset image processing to the image data stored in the memory 3 and generates a signal or image data, obtains and/or generates various information, and the like. The image processing circuit 4 may be, for example, a dedicated hardware circuit such as an application-specific integrated circuit (ASIC) designed to realize a specific function or may be configured to realize a specific function via a programmable processor such as a digital signal processor (DSP) executing a software.

The image processing applied by the image processing circuit 4 includes preprocessing, color interpolation processing, correction processing, detection processing, data modification processing, evaluation value calculation processing, and the like. The preprocessing includes signal amplification, reference level adjustment, defective pixel correction, noise reduction, and the like. The color interpolation processing is processing for interpolating values of color components that are not included in image data that has been read out from pixels, and is also referred to as demosaicing processing. The correction processing includes white balance adjustment, processing for correcting image luminance, processing for correcting aberration of the imaging optical system 1, color correction processing, and the like. The detection processing includes processing for detecting and tracking a characteristic area (for example, a face area, an eye area, and a human body area), processing for recognizing a person, and the like. The data modification processing includes scaling processing, header information (metadata) generation processing, and the like. The evaluation value calculation processing is processing for calculating evaluation values for contrast AF, processing for calculating evaluation values that are used in automatic exposure control, and the like. Also, processing for generating a pair of image signals for phase detection AF based on image data and processing for calculating a defocus amount based on a pair of image signals can be executed at the image processing circuit 4. Note that these are examples of the image processing that can be implemented by the image processing circuit 4, and are not intended to limit the image processing applied by the image processing circuit 4.

A system control circuit 5 is, for example, a CPU (also referred to as a MPU or microprocessor). The system control circuit 5 controls the operation of the components of the digital camera 100 by loading a program stored in a ROM 15 into a RAM 14 and executing the program to realize the function of the digital camera 100. Note that in the case in which the imaging optical system 1 is replaceable, the system control circuit 5 communicates with a controller provided in the imaging optical system 1 and controls the operation of the imaging optical system 1.

The ROM 15 is a rewritable non-volatile memory and stores a program executed by the system control circuit 5, various setting values of the digital camera 100, GUI data, and the like. The RAM 14 is used as the main memory when the system control circuit 5 executes programs. Note that the memory 3 and the RAM 14 may be different areas within the same memory space.

A portion of the operation of the system control circuit 5 includes performing automatic exposure control (AE) based on an evaluation value generated at the image processing circuit 4 and determining the imaging conditions. Examples of imaging conditions for still image capturing, for example, include shutter speed, f-number, and sensitivity. The system control circuit 5 determines one or more of the shutter speed, the f-number, and the sensitivity according to the AE mode selected. The system control circuit 5 controls the f-numbers of the diaphragm mechanism via an exposure amount control circuit 6.

Also, the system control circuit 5, functioning as focus adjustment means, drives the focus lens of the imaging optical system 1 based on an evaluation value or a defocus amount found by the image processing circuit 4 and performs automatic focus (AF) detection processing to focus the imaging optical system 1 on a desired subject. The system control circuit 5 drives the focus lens via a focus lens control circuit 7.

The system control circuit 5, as an operation in response to the operation of an operation member 12, drives the zoom lens of the imaging optical system 1 via a focal length control circuit 8. Also, the system control circuit 5 controls access to a recording medium 10 relating to the recording, reading, and deleting of image data.

The exposure amount control circuit 6 drives the diaphragm mechanism provided in the imaging optical system 1 in accordance with control via the system control circuit 5. The exposure amount control circuit 6 adjusts the drive timing and gain of the image sensor 2 again in accordance with control via the system control circuit 5.

A focus lens control circuit 7 drives the focus lens of the imaging optical system 1 in accordance with control via the system control circuit 5.

The focal length control circuit 8 drives the zoom lens of the imaging optical system 1 in accordance with control via the system control circuit 5 and adjusts the focal length (angle of view) of the imaging optical system 1.

A compression/expansion circuit 9 encodes and decodes still image data and moving image data via a preset encoding method. Examples of encoding methods for still image data include the JPEG method and the HEIF method, and examples of encoding moving image data include the H.265/HEVC method and the H.264/AVC method. The compression/expansion circuit 9 may be able to use a plurality of encoding methods for both the still image data and the moving image data. The image data encoded at the compression/expansion circuit 9 is recorded in the recording medium 10 as a data file. Also, the compression/expansion circuit 9 decodes encoded image data contained in the data file read out from the recording medium 10 and stores it in the memory 3.

The display device 11 displays an image, a GUI, information of the digital camera 100, and the like. The display device 11 may be able to control the display of an external display device.

The operation member 12 is a general term for describing an input device assembly that receives input from a user. In a case in which the display device 11 is a touch display, a touch panel is provided in the operation member 12. The input devices constituting the operation member 12 are given names based on the function statically or dynamically allocated to them. Representative examples of such names include release button, menu button, directional key, select button, and power button. The system control circuit 5 detects an operation associated with an input device of the operation member 12 and executes an operation corresponding to the detected operation.

A communication circuit 13 is a communication interface with an external device and supports at least one wired and/or wireless communication standards. The external device may be directly connected to the digital camera 100 or may be connected to the digital camera 100 via a network.

Figure 2:
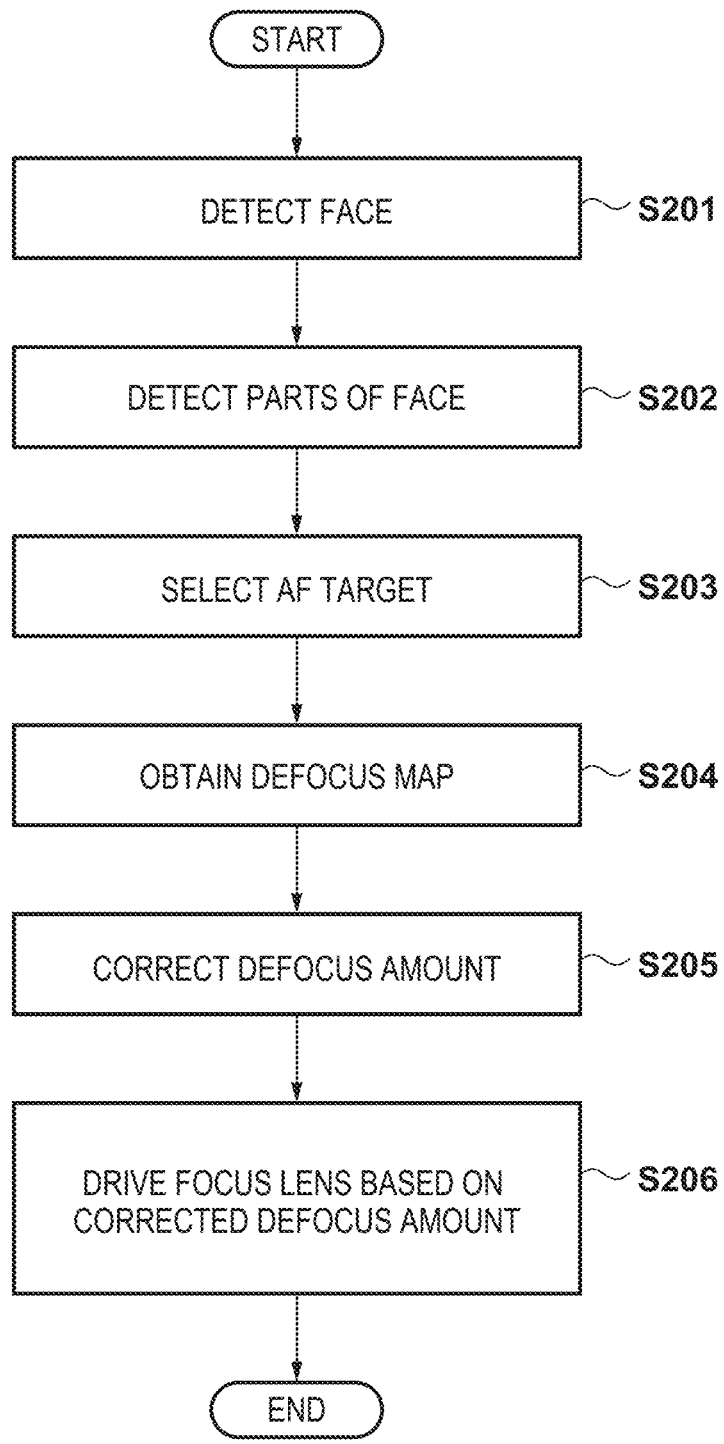
FIG. 2 is a flowchart relating to focus detection processing of an embodiment.

FIG. 2 is a flowchart illustrating an example of an automatic focus (AF) detection operation of the digital camera 100. Here, the digital camera 100 is set to an AF mode in which an eye area within a face area is focused on. This AF mode is an example of an AF mode the digital camera 100 is able to be set to in which a characteristic area within a subject area is focused on.

The operations indicated in FIG. 2 can be started in response to the system control circuit 5 detecting a capturing preparation instruction for a still image via operation of the release button of the operation member 12 while in a still image capturing standby state, for example. In this example, in the still image capturing standby state, moving image capturing and display are continuously performed with the display device 11 functioning as an electronic viewfinder (EVF), for example. The moving image data for display generated by the display device 11 functioning as a EVF is referred to as live view or through video.

In step S201, the system control circuit 5 instructs the image processing circuit 4, i.e., area detection means, to execute subject detection processing on a frame image of the live view. The image processing circuit 4 is able to execute subject detection processing on one or more types of subjects. Here, as the mode has been set to an AF mode in which the eye area is focused on, subject detection processing is executed on the face of a person. The method for detecting the area considered to be the face of a person from an image is not particularly limited. For example, a method using pattern matching, a method using a learning algorithm such as a neural network, and the like can be used. The image processing circuit 4 can obtain the center coordinates, size, face orientation (left, right, up, down), and the like for each detected area (referred to as the face area below) as the result of subject detection processing.

In step S202, the image processing circuit 4 executes processing for detecting parts (organs) of the face, such as the eyes and nose, in the detected face area. A known method for detecting organs can be used, thus detailed description thereof is omitted. Here, at least in detecting the center coordinates of the eye, center coordinates of the left eye (xl, yl) and center coordinates of the right eye (xr, yr) are taken. The coordinate system of the image is an x-y Cartesian coordinate system with the top left corner defined as the origin, the right direction defined as the x-axis direction, and the down direction defined as the y-axis direction. Note that in the case in which two or more face areas are detected in step S201, the image processing circuit 4 executes organ detection processing on a single representative face area (main face area). The main face area may be the largest face area, for example. In the case in which the difference in size between the face areas is small, the main face area is determined according to one or more preset criteria such as which face area is closest to the center of the image. Also, the main face area may be selected by the user.

In step S203, the image processing circuit 4 selects one eye area as the AF target. Note that this may be selected by the user instead of being selected by the image processing circuit 4. In the case in which the AF target is selected by the user, the system control circuit 5, for example, displays a frame-shaped mark superimposed over the left eye area and the right eye area and prompts the user for selection. The system control circuit 5 notifies the image processing circuit 4 of the eye area corresponding to the mark selected at the time a selection instruction from the operation member 12 is detected. Here, the processing described above is executed on the captured image of a face oriented to the right such as that illustrated in FIG. 3, and the back eye (right eye) is selected to be the AF target.

Figure 3:
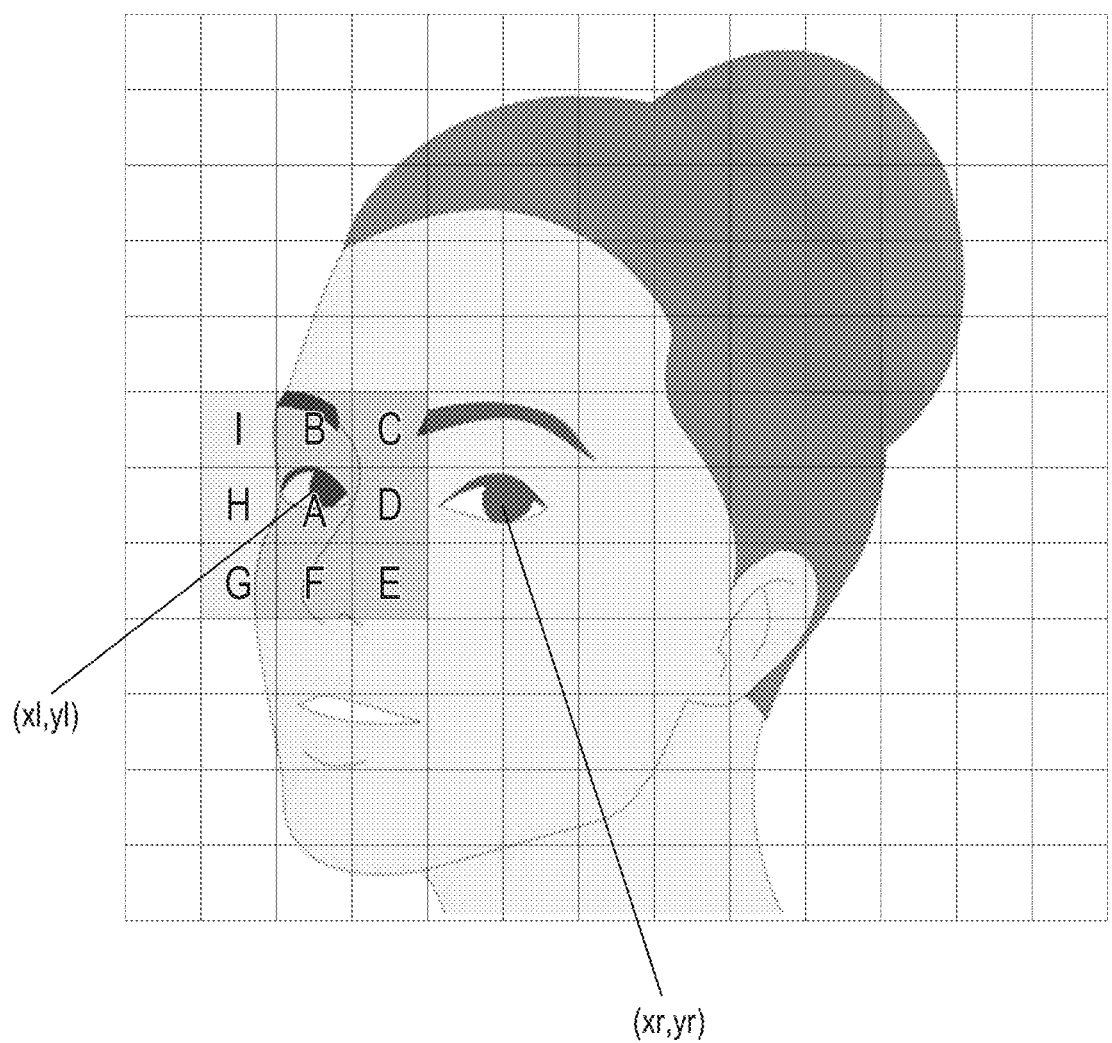
FIG. 3 is a diagram illustrating an example of a subject and a defocus map.

In step S204, the image processing circuit 4, functioning as setting means, sets an AF area centered at the coordinates (xl, yl in this example) of the eye area that is the AF target. In an AF mode in which an eye area within a face area is focused on, an AF area smaller than that of other AF modes is set. In this example, a square shaped AF area with the eye area coordinates set as the center coordinates is set. In the example illustrated in FIG. 3, area A is the set AF area.

Also, the image processing circuit 4, functioning as defocus amount detection means, detects the defocus amount for the AF area and peripheral areas. In this example, the peripheral areas are eight areas B to I with the same size as the AF area located adjacent to the AF area in the up-down, left-right directions and the diagonal directions (45 degrees, 135 degrees, 225 degrees, and 315 degrees). The defocus amount of each area includes a magnitude corresponding to the difference between the focus lens position when the area is in focus and the current focus lens position and a plus or minus symbol corresponding to the direction of the difference. Thus, the defocus amount of an area indicates the amount and the direction in which the focus lens needs to be moved for the area to be in focus.

The detection of the defocus amount of each area can be performed using a known method. For example, the system control circuit 5 may incrementally move the focus lens in the direction of infinity and the direction of the closest end, using the current focus lens position as a reference. Also, the system control circuit 5 may capture an image at each focus lens position and obtain an image. The image processing circuit 4 may calculate a contrast evaluation value of the image for each area and detect for each area the focus lens position (focus position) with the greatest contrast evaluation value. Also, the image processing circuit may obtain the difference between a reference position and a focus position as the defocus amount. Alternatively, in the case in which the pixels of the image sensor 2 include a plurality of photoelectric conversion areas, a pair of image signals for phase detection AF for each area may be generated at the image processing circuit 4 and the defocus amount may be obtained from the phase detection of the different image signals. The image processing circuit 4 may output the defocus amount (defocus map) detected for each area to the system control circuit 5.

In step S205, the system control circuit 5, functioning as correction means, performs processing of correcting the defocus amount detected in the AF area. In the case in which focus detection is performed on a characteristic area within a subject area, most preferably, a position, size, and shape of an AF area are determined so that the characteristic area completely encompasses the AF area. However, there are limitations to what AF area can be set in terms of position, size, and shape. Thus, even when the size of the AF area is set to the smallest size possible, pixels outside of the characteristic area are often contained in the AF area.

Accordingly, in the present embodiment, when performing focus detection on a characteristic area within a subject area, the defocus amount detected in the AF area is corrected based on the defocus amounts detected in the peripheral areas of the AF area. This allows focusing accuracy to be increased. Note that in other embodiments, the defocus amount is not corrected. The defocus amount correction processing is described in detail below.

In step S206, the system control circuit 5 drives the focus lens via the focus lens control circuit 7 based on the corrected defocus amount and focus detection processing ends.

Next, the defocus amount correction processing performed in step S205 will be described using a specific example and with reference to FIGS. 4 through 6B.

Figure 4:
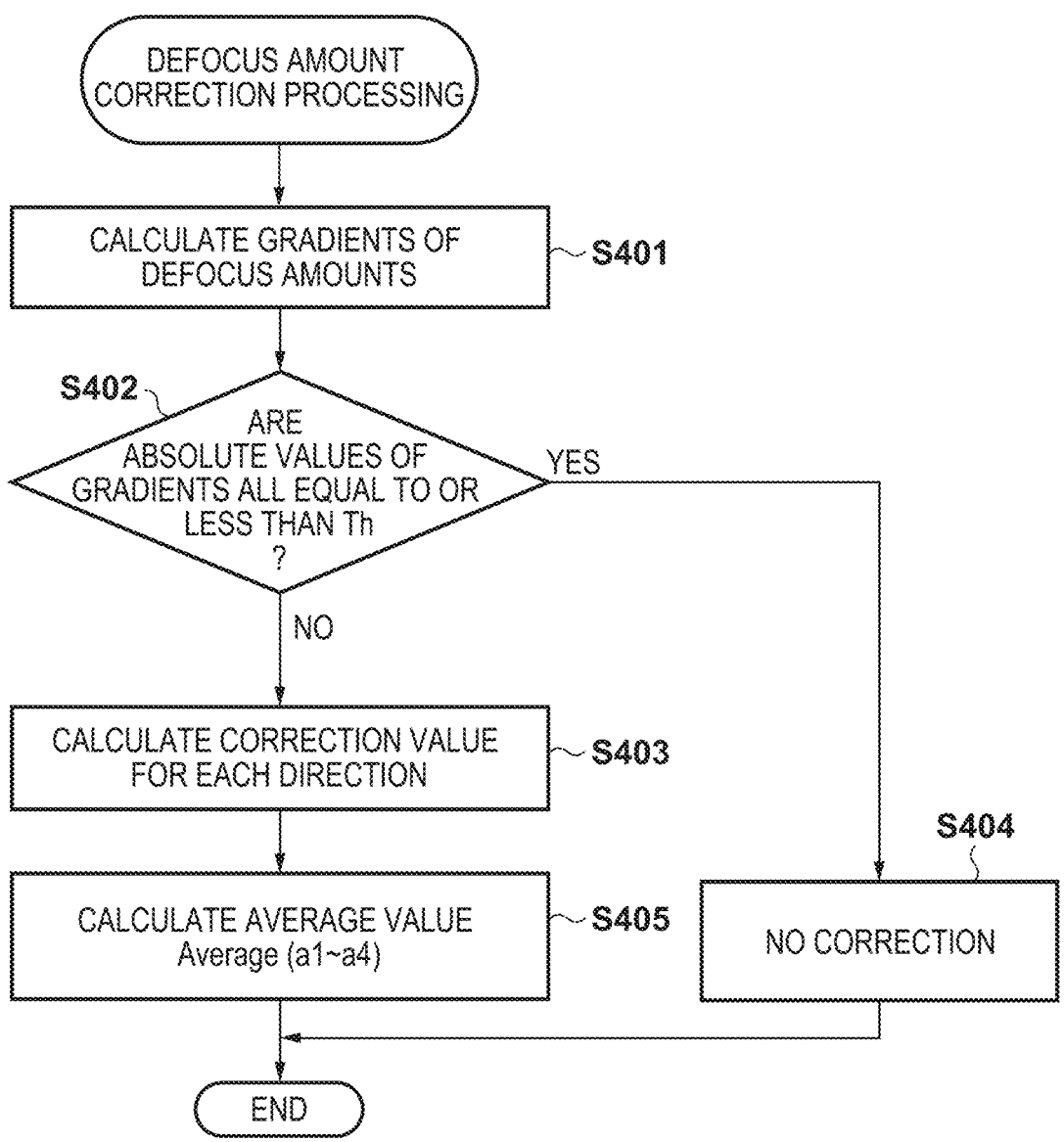
FIG. 4 is a flowchart relating to defocus amount correction processing of an embodiment.

FIG. 4 is a flowchart relating to the defocus amount correction processing.

In step S401, the system control circuit 5 calculates the gradients (difference) of the defocus amounts for the AF area A and the peripheral areas B to I from the defocus map obtained from the image processing circuit 4 in step S204. Hereinafter, the defocus amounts detected in the areas A to I illustrated in FIG. 5A are denoted by a to i as illustrated in FIG. 5B. The arrows in FIG. 5B indicate the gradients (difference) in the defocus amounts obtained in step S401.

In step S402, the system control circuit 5 compares the absolute values of the gradients of the defocus amounts obtained in step S401 to a threshold Th. Then, in the case in which the absolute values of the gradients of the defocus amounts are all equal to or less than threshold Th, the system control circuit 5 moves the process to step S404. In the case in which the absolute value of at least one gradient of the defocus amounts is greater than the threshold Th, the system control circuit 5 moves the process to step S403. Here, the threshold Th may be a fixed value or a dynamically set value. For example, in shallow depth of field imaging conditions, the threshold can be decreased, and in deep depth of field imaging conditions, the threshold can be increased.

Figure 6A:
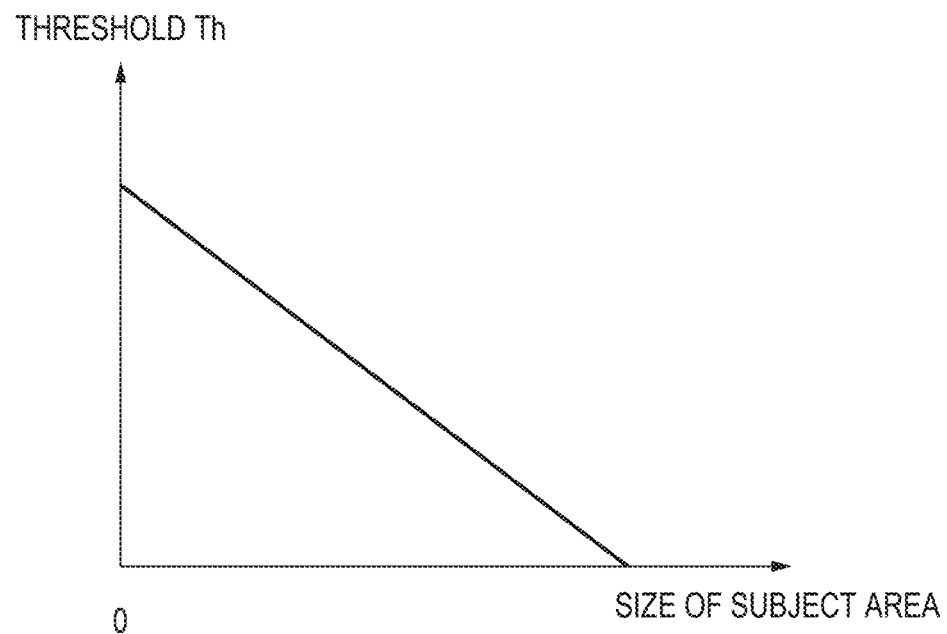
FIGS. 6A and 6B are diagrams relating to defocus amount correction processing of an embodiment.

FIG. 6A illustrates an example in which depth of field is affected by conditions and the threshold Th is dynamically set using the size of the subject area (in this example, the face area). It is plausible that when the subject area is large, the distance to the subject is short, thus in this case, the threshold Th is decreased. Also, it is plausible that when the subject area is small, the distance to the subject is long, thus in this case, the threshold Th is increased. FIG. 6A illustrates an example with a relationship in which the threshold Th linearly decreases as the size of the subject area increases. However, the relationship may be one in which the threshold Th non-linearly decreases as the size of the subject area increases, or one in which the threshold Th incrementally decreases. It is sufficient that a first threshold Th1 for a first size of the subject area and a second threshold Th2 for a second size (greater than the first size) of the subject area satisfy the relationship Th1>Th2. The threshold Th may be set based on conditions other than the size of the subject area, such as the f-number (the smaller the f-number the shallower the depth of field), the focal length of the imaging optical system (the greater the focal length the shallower the depth of field), and the like.

In step S404, the system control circuit 5 determines not to perform processing of correcting the defocus amount detected in the AF area A and ends the process.

In step S403, the system control circuit 5 calculates the correction value for each direction. Specifically, the system control circuit 5 calculates the correction value using the defocus amount detected for one of two adjacent peripheral areas for each direction, the directions being, centered at the AF area A, the up-down direction, the left-right direction, the 45 degrees direction, and the 135 degrees direction. For example, the detected defocus amounts illustrated in FIG. 5C are for the areas A to I illustrated in FIG. 5A.

The calculation of the correction value of the up-down direction will now be described. As illustrated in FIG. 5D, the gradient of defocus amounts a, b of the area A and the area B adjacent above the area A is defined as d1, and d1=a−b=10. In a similar manner, the gradient of defocus amounts a, f of the area A and the area F adjacent below the area A is defined as d2, and d2=a−f=−30. In this way, in the case in which the absolute value of the gradient is different, the defocus amount a can be corrected using the defocus amount with the smallest absolute value for its gradient (in this example, the defocus amount b detected in the area B). The system control circuit 5 obtains a corrected defocus amount a1 following Equation (1) below, for example.

$$a1=\{(a\times|d1|)+(b\times|d2|)\}/(|d1|+|d2|)=22.5 \qquad \text{Equation (1)}$$

Figure 6B:
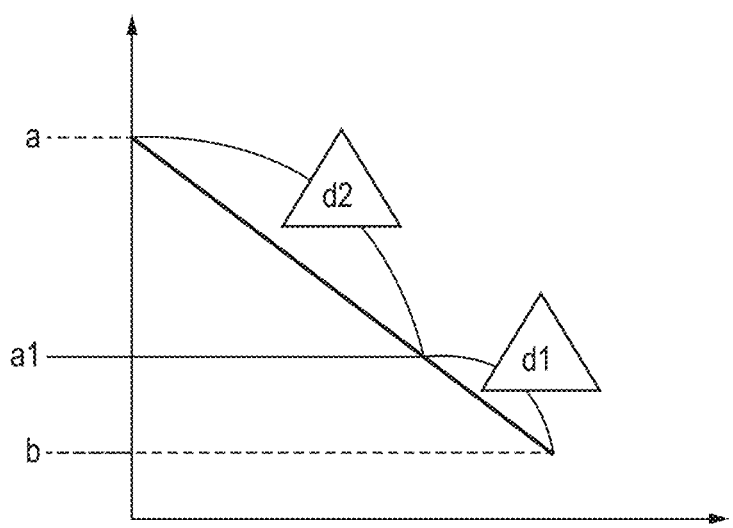

FIG. 6B schematically illustrates the calculation of the correction value a1 derived from Equation (1). As can be seen, by finding a gradient d1, d2 weighted average of the defocus amount a detected in the AF area A and the defocus amount b with a small gradient with the defocus amount a, the correction value of the defocus amount detected in the AF area A for each direction is calculated. In this case, the defocus amount b is weighted.

In a similar manner to the up-down direction, the system control circuit 5 calculates the correction values a2 to a4 for the left-right direction, the diagonal 45 degrees direction, and the diagonal 135 degrees direction.

In step S405, the system control circuit 5 calculates the average value of the correction values a1 to a4 of each direction to obtain a final defocus amount for the AF area A, and the correction processing ends.

Modified Examples

Note that in calculating the correction value of each direction in step S403, in the case in which all of the defocus gradients are large (for example, are greater than the threshold used in step S402), the defocus amount a detected in AF area A may be used as the correction value for the directions. For example, when calculating the correction value a1 of the up-down direction, in the case in which d1 and d2 are both large, a1 can be defined as a.

Also, in the example, in step S405, the average value of the correction values a1 to a4 of the directions is used as the final defocus amount. However, the correction value from among the correction values a1 to a4 with the smallest difference from the defocus amount a detected in the AF area A can be used as the final defocus amount. The final defocus amount can be obtained via another method using the correction values a1 to a4.

Furthermore, instead of obtaining the correction values for each direction, the correction values of only the defocus amounts from among the defocus amounts detected in the peripheral areas with a gradient equal to or less than the threshold may be obtained.

Note that in the present embodiment, in the case the AF mode in which a characteristic area within a subject area is focused on is set, the defocus amount detected in the AF area is corrected based on the defocus amount detected in the peripheral areas. However, correction may only be performed in the case of other conditions being satisfied. For example, the defocus amount detected in the AF area may be corrected in the case in which, in addition to the condition of the AF area being set to a characteristic area within a subject area, any one of the following conditions are satisfied:

The size of the AF area is equal to or less than a threshold; and

The AF area is located in an edge portion of the subject area.

In the case in which the size of the AF area is equal to or less than a threshold, the accuracy of the defocus amount is more likely to decrease. Also, in the case in which the AF area is located in an edge portion of the subject area, the background of the subject is more likely to be included in the AF area.

Furthermore, in the case in which the characteristic area to be focused on is an eye area, when setting the AF area to the back eye area as seen from the digital camera, the defocus amount detected in the AF area may be corrected, and when setting the AF area to the front eye area, correction may not be performed. This is because the back eye is affected by the nose and the back eye is also more likely to be on the edge portion of the face area. Which eye area is on the back side can be determined via the face orientation obtained by face detection processing.

Also, in the case in which the back eye area is to be focused on, the defocus amount of the front eye area may also be detected. In this case, to make the focusing distance farther than the distance to the front eye area, the detected defocus amount of the front eye area can be used as a value to limit the final defocus amount obtained for the back eye area. Also, instead of the front eye area, the defocus amount of a nose area may be used.

As described above, according to the present embodiment, in the AF mode in which a characteristic area within a subject area is focused on, the defocus amount detected in the AF area is corrected based on the defocus amount detected in the peripheral areas of the AF area. This reduces the effect of pixels outside of the characteristic area included in the AF area and allows a focus detection result with good accuracy to be obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-151373, filed on Aug. 21, 2019, which is hereby incorporated by reference herein in its entirety.

What is claimed is:

1. An image capture apparatus comprising:
an area detection circuit that detects, from an image, a subject area and a characteristic area within the subject area;
a setting circuit that sets an AF area to the characteristic area;
a defocus amount detection circuit that detects a defocus amount for the AF area and defocus amounts for peripheral areas of the AF area;
a correction circuit that corrects the defocus amount detected for the AF area based on the defocus amounts detected for the peripheral areas; and
a focus adjustment circuit that adjusts focus of an imaging optical system based on the defocus amount corrected by the correction circuit.

2. The image capture apparatus according to claim 1, wherein
the correction circuit
obtains gradients of the defocus amount detected for the AF area and the defocus amounts detected for the peripheral areas of the AF area; and
corrects the defocus amount in a case in which at least one of the gradients is greater than a threshold and does not correct the defocus amount in a case in which none of the gradients is greater than the threshold.

3. The image capture apparatus according to claim 1, wherein
the correction circuit:
performs the correction in a case in which a size of the AF area is equal to or less than a threshold or a case in which the AF area is located in an edge portion of the subject area; and does not perform the correction in a case in which the size of the AF area is greater than the threshold or a case in which the AF area is not located in the edge portion of the subject area.

4. The image capture apparatus according to claim 1, wherein the subject area is a face area and the characteristic area is an eye area.

5. The image capture apparatus according to claim 1, wherein the subject area is a face area and the characteristic area is an eye area; and
the correction circuit:
performs the correction in a case in which the AF area is set is a back eye area, and
does not perform the correction in a case in the AF area is set is a front eye area.

6. The image capture apparatus according to claim 1, wherein:
the subject area is a face area and the characteristic area is an eye area; the defocus amount detection circuit detects a defocus amount for each of eye areas; and
the correction circuit uses a defocus amount detected for a front eye area among the eye areas to limit the corrected defocus amount of the defocus amount detected for a back eye area among the eye areas.

7. The image capture apparatus according to claim 1, further comprising:
a determination circuit that determines whether to perform a correction of the defocus amount detected for the AF area, based on the defocus amount for the AF area and the defocus amounts detected for the peripheral areas, and
wherein:
the correction circuit corrects the defocus amount detected for the AF area based on the defocus amounts detected for the peripheral areas, in a case where the determination circuit determines to perform the correction; and
the focus adjustment circuit adjusts focus of an imaging optical system based on the defocus amount corrected by the correction circuit, in a case where the determination circuit determines to perform the correction.

8. The image capture apparatus according to claim 1, wherein
the correction circuit:
obtains, for each of preset directions, gradients of the defocus amount between the AF area and each of two of the peripheral areas that are adjacent to the AF area in one of the preset directions;
calculates a correction value, for each of the preset directions, based on (i) among the defocus amounts detected for the two peripheral areas, one for which a smaller gradient is obtained, and (ii) the defocus amount detected for the AF area; and
corrects the defocus amount detected for the AF area based on the plurality of correction values calculated for the preset plurality of directions.

9. The image capture apparatus according to claim 8, wherein
the correction circuit obtains an average value of the plurality of correction values as the corrected defocus amount for the AF area.

10. The image capture apparatus according to claim 8, wherein
the correction circuit obtains, among the plurality of correction values, one having a smallest difference from the defocus amount detected for the AF area as the corrected defocus amount for the AF area.

11. A method for controlling an image capture apparatus comprising:
detecting, from an image, a subject area and a characteristic area within the subject area;
setting an AF area to the characteristic area;
detecting a defocus amount for the AF area and defocus amounts for peripheral areas of the AF area;
correcting the defocus amount detected for the AF area based on the defocus amounts detected for the peripheral areas; and
adjusting focus of an imaging optical system based on the defocus amount corrected in the correcting.

12. A non-transitory computer-readable medium that stores a program for causing a processor included in an image capture apparatus, when executed by the processor, to functions as:
an area detection unit configured to detect, from an image, a subject area and a characteristic area within the subject area;
a setting unit configured to set an AF area to the characteristic area;
a defocus amount detection unit configured to detect a defocus amount for the AF area and defocus amounts for peripheral areas of the AF area;
a correction unit configured to correct the defocus amount detected for the AF area based on the defocus amounts detected for the peripheral areas; and
a focus adjustment unit configured to adjust focus of an imaging optical system based on the defocus amount corrected by the correction unit.

* * * * *